United States Patent
Tang et al.

(10) Patent No.: US 11,868,823 B2
(45) Date of Patent: Jan. 9, 2024

(54) APPARATUS AND METHOD FOR LOCKING PCIE NETWORK HAVING NON-TRANSPARENT BRIDGING

(71) Applicant: Huawei Technologies Co., Ltd., Shenzhen (CN)

(72) Inventors: Hongliang Tang, Hopkinton, MA (US); Li Wan, Hopkinton, MA (US); Lili Chen, Hopkinton, MA (US); Zhihao Tang, Shrewsbury, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 17/304,535

(22) Filed: Jun. 22, 2021

(65) Prior Publication Data
US 2021/0311809 A1  Oct. 7, 2021

Related U.S. Application Data

(63) Continuation of application No. PCT/CN2019/084111, filed on Apr. 24, 2019.
(Continued)

(51) Int. Cl.
*G06F 12/10* (2016.01)
*G06F 13/40* (2006.01)
(Continued)

(52) U.S. Cl.
CPC .............. *G06F 9/526* (2013.01); *G06F 12/10* (2013.01); *G06F 13/4031* (2013.01);
(Continued)

(58) Field of Classification Search
CPC ...... G06F 9/526; G06F 12/10; G06F 13/4031; G06F 13/4282; G06F 2212/65; G06F 2213/0026
See application file for complete search history.

(56) References Cited

U.S. PATENT DOCUMENTS 7,313,794 B1 * 12/2007 Ansari ............... G06F 13/1663
710/108
8,244,951 B2  8/2012 Davis et al.
(Continued)

FOREIGN PATENT DOCUMENTS

CN    101178701 A    5/2008
CN    101669082 A    3/2010
(Continued)

OTHER PUBLICATIONS

"Chinese Application No. 201980079575.8, Chinese Office Action dated Apr. 19, 22", (dated Apr. 19, 2022), 10 pgs.
(Continued)

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

An interconnected computer system includes a Peripheral Component Interconnect Express (PCIe) fabric, a first computer system communicatively coupled to the PCIe fabric, a second computer system communicatively coupled to the PCIe fabric, and a shared single-access hardware resource coupled to the PCIe fabric. The first computer system includes a first processor and first memory coupled to the first processor configured to store a first flag indicating a desire of the first computer system to access the shared single-access hardware resource and a turn variable indicating which of the first computer system and the second computer system has access to the shared single-access hardware resource. The second computer system includes a second processor and second memory coupled to the second processor configured to store a second flag indicating a desire of the second computer system to access the shared single-access hardware resource.

20 Claims, 6 Drawing Sheets

Related U.S. Application Data

(60) Provisional application No. 62/785,778, filed on Dec. 28, 2018.

(51) Int. Cl.
 G06F 13/42 (2006.01)
 G06F 9/52 (2006.01)

(52) U.S. Cl.
 CPC ...... G06F 13/4282 (2013.01); G06F 2212/65 (2013.01); G06F 2213/0026 (2013.01)

(56) References Cited

U.S. PATENT DOCUMENTS

| | | | |
|---|---|---|---|
| 8,806,098 | B1 | 8/2014 | Mandapuram et al. |
| 2004/0117571 | A1 | 6/2004 | Chang et al. |
| 2004/0268015 | A1 | 12/2004 | Pettey et al. |
| 2007/0271405 | A1* | 11/2007 | Moore ................ G06F 13/4031 710/309 |
| 2008/0147904 | A1* | 6/2008 | Freimuth ................ G06F 13/28 710/22 |
| 2008/0147938 | A1 | 6/2008 | Freimuth et al. |
| 2009/0248947 | A1 | 10/2009 | Malwankar et al. |
| 2011/0167189 | A1* | 7/2011 | Matsubara ............ G06F 3/0689 710/308 |
| 2011/0225588 | A1* | 9/2011 | Pollock .................... G06F 9/46 718/102 |
| 2015/0026385 | A1* | 1/2015 | Egi ........................ H04L 47/785 710/314 |
| 2017/0212858 | A1 | 7/2017 | Chu et al. |
| 2017/0357609 | A1* | 12/2017 | Long .................... G06F 13/4282 |

FOREIGN PATENT DOCUMENTS

| | | |
|---|---|---|
| CN | 101674233 A | 3/2010 |
| CN | 102341797 A | 2/2012 |
| CN | 104715001 A | 6/2015 |
| CN | 105793830 A | 7/2016 |
| CN | 105993009 A | 10/2016 |
| CN | 106462394 A | 2/2017 |
| CN | 107015928 A | 8/2017 |
| CN | 107066405 A | 8/2017 |
| CN | 107113210 A | 8/2017 |
| CN | 108694152 B | 7/2021 |
| EP | 2515241 A2 | 10/2012 |
| TW | I621946 B | 4/2018 |
| WO | WO-2018107281 A1 | 6/2018 |
| WO | WO-2020133841 A1 | 7/2020 |

OTHER PUBLICATIONS

"Chinese Application No. 201980079575.8, Notice of Allowance dated Jan. 18, 2023", (dated Jan. 18, 2023), 4 pgs.

"European Application No. 19903240.0, Extended European Search Report dated Aug. 9, 2021", (dated Aug. 9, 2021), 17 pgs.

"International Application No. PCT/CN2019/084111, International Search Report and Written Opinion dated Oct. 8, 2019", (dated Oct. 8, 2019), 6 pgs.

* cited by examiner

APPARATUS AND METHOD FOR LOCKING PCIE NETWORK HAVING NON-TRANSPARENT BRIDGING

CROSS REFERENCE TO RELATED APPLICATIONS

This application is a continuation application of International Application No. PCT/CN2019/084111, filed 24 Apr. 2019, which claims the benefit of priority to U.S. Provisional Application 62/785,778, filed 28 Dec. 2018, and entitled "Apparatus and Method for Locking PCIe Network Having Non-Transparent Bridging," the benefit of priority of each of which is claimed herein, and which applications and publication are hereby incorporated herein by reference in their entirety.

TECHNICAL FIELD

The present application relates to communications technology; and more particularly to sharing single-access hardware resources within an interconnected computer system.

BACKGROUND

Interconnected computer systems typically include a plurality of individual computer systems that are interconnected by a communications network. Examples of interconnected computer systems include network storage centers, data processing centers, web server centers, and other types of systems that include multiple computer systems. The communications network servicing the plurality of individual computer systems may be optical networks, Local Area Networks (LANs) or other types of networks, such as PCI networks.

Interconnected computer systems typically share single-access hardware resources, e.g., memory, shared Input/Output (I/O) ports, specialized processing resources, and bulk storage, among other shared resources, which may only be accessed by a single process/processor at any given time. Often times, multiple of the individual computer systems desire to access a shared single-access resource at a same time, which is not permitted. Thus, various algorithms have been established to facilitate access to shared single-access resources.

One such algorithm is called the "Peterson's algorithm," which was formulated by Gary L. Peterson in 1981. Peterson's algorithm is a concurrent programming algorithm for mutual exclusion that allows two or more processes to share a single-access resource without conflict, using only shared memory for communication. While Peterson's original formulation worked with only two processes, the algorithm was later generalized for more than two processes. Generally, Peterson's algorithm uses two variables, flag and turn. A flag[n] value of true indicates that the process n wants to enter the critical section (to access a shared single-access resource). Entrance to the critical section is granted for process[0] if process[1] does not want to enter its critical section (flag[1]=false) or if process[1] has given priority to process[0] by setting turn to 0.

Peterson's algorithm works only if writes of the flag[n] and turn variable are reliable. In some networks, such as Personal Computer Interconnect (PCI) networks, Peterson's algorithm is inefficient due to unreliable remote writes of the flag variable, which needs to be followed by a read of the flag variable to confirm that the flag variable was correctly written. When a non-transparent bridge forms a part of the PCI network and separates processes, efficiency in accessing the shared single-access resource is severely affected.

SUMMARY

In order to overcome the shortcomings of the prior systems and their operation, various embodiments are disclosed herein. According to a first embodiment an interconnected computer system includes a Peripheral Component Interconnect Express (PCIe) fabric, a first computer system communicatively coupled to the PCIe fabric, a second computer system communicatively coupled to the PCIe fabric, and a shared single-access hardware resource coupled to the PCIe fabric. The first computer system includes a first processor, first memory coupled to the first processor configured to store, a first flag indicating a desire of the first computer system to access the shared single-access hardware resource, and a turn variable indicating which of the first computer system and the second computer system has access to the shared single-access hardware resource. The second the second computer system includes a second processor, and second memory coupled to the second processor configured to store a second flag indicating a desire of the second computer system to access the shared single-access hardware resource.

The interconnected computer system of the first embodiment (as well as the second and third embodiments described further below) provide important performance gains as compared to the prior systems. The interconnected computer system may implement an improvement of the Peterson's lock algorithm that provides important operational benefits as compared to prior implementations. Traditionally, Peterson's lock algorithm included the remote writes of flag variables, i.e., Flag[0] stored on process[1] and Flag[1] stored on process[0]. This implementation was inefficient in a PCIe network due to unreliable remote writes, which needed to be followed up with a remote read to confirm that the remote write was successful. Further, when the PCIe network included a PCIe non-transparent bridge, address translation operations introduced additional operational difficulties.

Thus, to overcome the problems with the prior algorithms, the Flag variables are stored locally so that they are accessible via local writes (LWs) and local reads (LRs) as contrasted to remote writes (RWs) and remote reads (RRs). With the prior systems, for process P0 to access the single-access hardware resource, the following operations were required: RW+RR (set Flag[0]), RW+RR (set turn), LR+LR (busy lock), and RW+RR (reset Flag[0]), which totaled 6 remote operations and 2 local operations. With the first embodiment, for process P0 to access the single-access hardware resource, the following operations were required: LW (set Flag[0]), RW (set turn), RR (busy lock+confirm RW), LW (reset Flag[0]), which totaled 2 remote operations and 2 local operations.

With the prior systems, for process P1 to access the single-access hardware resource, the following operations were required: RW+RR (set Flag[1]), LW (set turn), LR+LR (busy lock), and RW+RR (reset Flag[1]), which totaled 4 remote operations and 3 local operations. With the embodiment of FIG. 1, for process P1 to access the single-access hardware resource, the following operations were required: LW (set Flag[1] and turn), RR (busy lock), LW (reset Flag[1]), which totaled 1 remote operation and 3 local operations. Thus, with the prior systems, a total of 10 remote operations and 5 local operations were required. With the embodiments described herein, a total of 3 remote operations and 5 local operations are required, a savings of 7 remote operations.

The first embodiment includes a number of optional aspects, which may be applied separately or in any combination. According to a first optional aspect, the first computer system resides on a first side of a non-transparent bridge of the PCIe fabric and the second computer system resides on a second side of the non-transparent bridge of the PCIe fabric. With this aspect, the non-transparent bridge of the PCIe fabric may perform address translation of data writes and data reads passing therethrough.

According to a second optional aspect, the first computer system includes a plurality of first sub-computer systems residing on a first side of a non-transparent bridge of the PCIe fabric and the second computer system includes a plurality of second sub-computer systems residing on a second side of a non-transparent bridge of the PCIe fabric. Further, with this aspect, the non-transparent bridge of the PCIe fabric may perform address translation of data writes and data reads passing therethrough. Further, with this optional aspect, the first memory may store a plurality of flags indicating corresponding desires of the plurality of first sub-computer systems to access the shared single-access hardware resource and the second memory may store a plurality of flags indicating corresponding desires of the plurality of second sub-computer systems to access the shared single-access hardware resource.

According to a third optional aspect of the first embodiment, the shared single-access hardware resource is shared memory. According to a fourth optional aspect of the first embodiment, the first computer system is a first network cluster and the second computer system is a shared network cluster.

According to a second embodiment of the present disclosure, an interconnected computer system includes a first PCIe fabric, a second PCIe fabric, a PCIe non-transparent bridge interconnecting the first PCIe fabric and the second PCIe fabric, a first node cluster communicatively coupled to the first PCIe fabric, a second node cluster communicatively coupled to the second PCIe fabric, and a shared single-access hardware resource coupled to one of the first PCIe fabric and the second PCIe fabric. The first node cluster includes a first memory configured to store at least one first flag indicating a desire of the first node cluster to access the shared single-access hardware resource and a turn variable indicating which of the first node cluster and the second node cluster has access to the shared single-access hardware resource. Further, the second node cluster includes a second memory configured to store at least one second flag indicating a desire of the second node cluster to access the shared single-access hardware resource.

The second embodiment also includes a plurality of optional aspects that may be application singularly or in any various combination. According to a first optional aspect, the first node cluster includes a plurality of first sub-computer systems residing on a first side of a non-transparent bridge of the PCIe fabric and the node cluster includes a plurality of second sub-computer systems residing on a second side of a non-transparent bridge of the PCIe fabric. With this aspect, the non-transparent bridge of the PCIe fabric may perform address translation of data writes and data reads passing therethrough. According to a second optional aspect, the shared single-access hardware resource is shared memory.

According to a third embodiment of the present disclosure, a method of operating an interconnected computer system having a PCIe fabric, a first computer system communicatively coupled to the PCIe fabric, a second computer system communicatively coupled to the PCIe fabric, and a shared single-access hardware resource coupled to the PCIe fabric is disclosed. According to the third embodiment, operations include the first computer system storing in a first local memory a first flag indicating a desire of the first computer system to access the shared single-access hardware resource and a turn variable indicating which of the first computer system and the second computer system has access to the shared single-access hardware resource. Operations of the third embodiment further include the second computer system storing in a second local memory a second flag indicating a desire of the second computer system to access the shared single-access hardware resource. These operations further include, based upon a state of the first flag indicating the desire of the first computer system to access the shared single-access hardware resource and the turn variable, the first computer system accessing the shared single-access hardware resource. Moreover, these operations may further include, based upon a state of the second flag indicating the desire of the second computer system to access the shared single-access hardware resource and the turn variable, the second computer system accessing the shared single-access hardware resource.

The third embodiment further includes optional aspects that may be applied singularly or in any various combination. According to a first optional aspect, the first computer system resides on a first side of a non-transparent bridge of the PCIe fabric and the second computer system resides on a second side of the non-transparent bridge of the PCIe fabric. With this optional aspect, the non-transparent bridge of the PCIe fabric may performing address translation of data writes and data reads passing therethrough.

According to a second optional aspect of the third embodiment, the first computer system includes a plurality of first sub-computer systems residing on a first side of a non-transparent bridge of the PCIe fabric and the second computer system includes a plurality of second sub-computer systems residing on a second side of a non-transparent bridge of the PCIe fabric. With this optional aspect, the non-transparent bridge of the PCIe fabric may perform address translation of data writes and data reads passing therethrough.

According to a third optional aspect of the third embodiment, the first local memory stores a plurality of flags indicating corresponding desires of the plurality of first sub-computer systems to access the shared single-access hardware resource and the second local memory storing a plurality of flags indicating corresponding desires of the plurality of second sub-computer systems to access the shared single-access hardware resource.

According to a fourth optional aspect of the third embodiment, the shared single-access hardware resource is shared memory. According to a fifth optional aspect of the third embodiment, the first computer system is a first network cluster and the second computer system is a shared network cluster.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
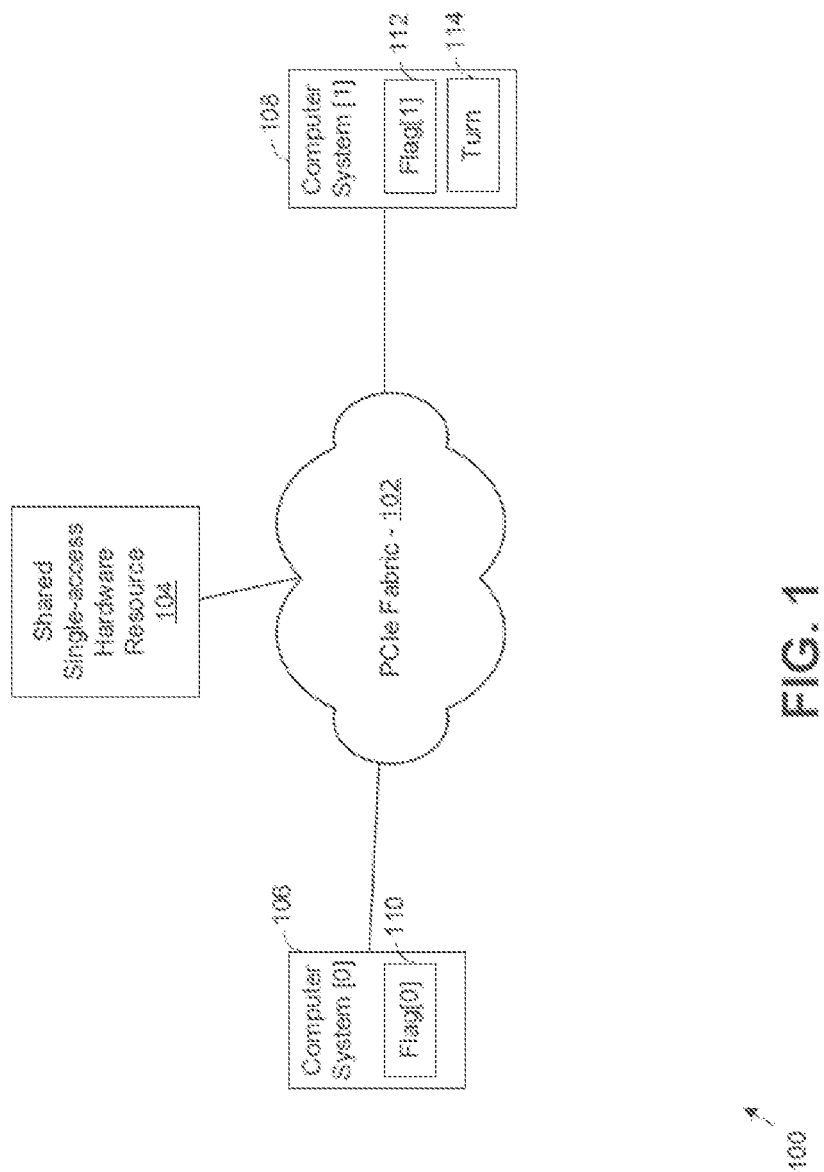
FIG. 1 is a system diagram illustrating an interconnected computer system according to a first described embodiment.

FIG. 1 is a system diagram illustrating an interconnected computer system according to a first described embodiment. The interconnected computer system 100 includes a Peripheral Component Interconnect Express (PCIe) fabric 102, a first computer system 106 communicatively coupled to the PCIe fabric 102, a second computer system 108 communicatively coupled to the PCIe fabric 102, and a shared single-access hardware resource 104 coupled to the PCIe fabric. The shared single-access hardware resource 104 is a component that may be only accessed by a single process/computer system at a single time and may be one or more of static memory, dynamic memory magnetic memory, a communication interface, or another type of hardware resource that is may be accessed only by a single process/computer system without jeopardize coherent and consistent resource operations.

Figure 6:
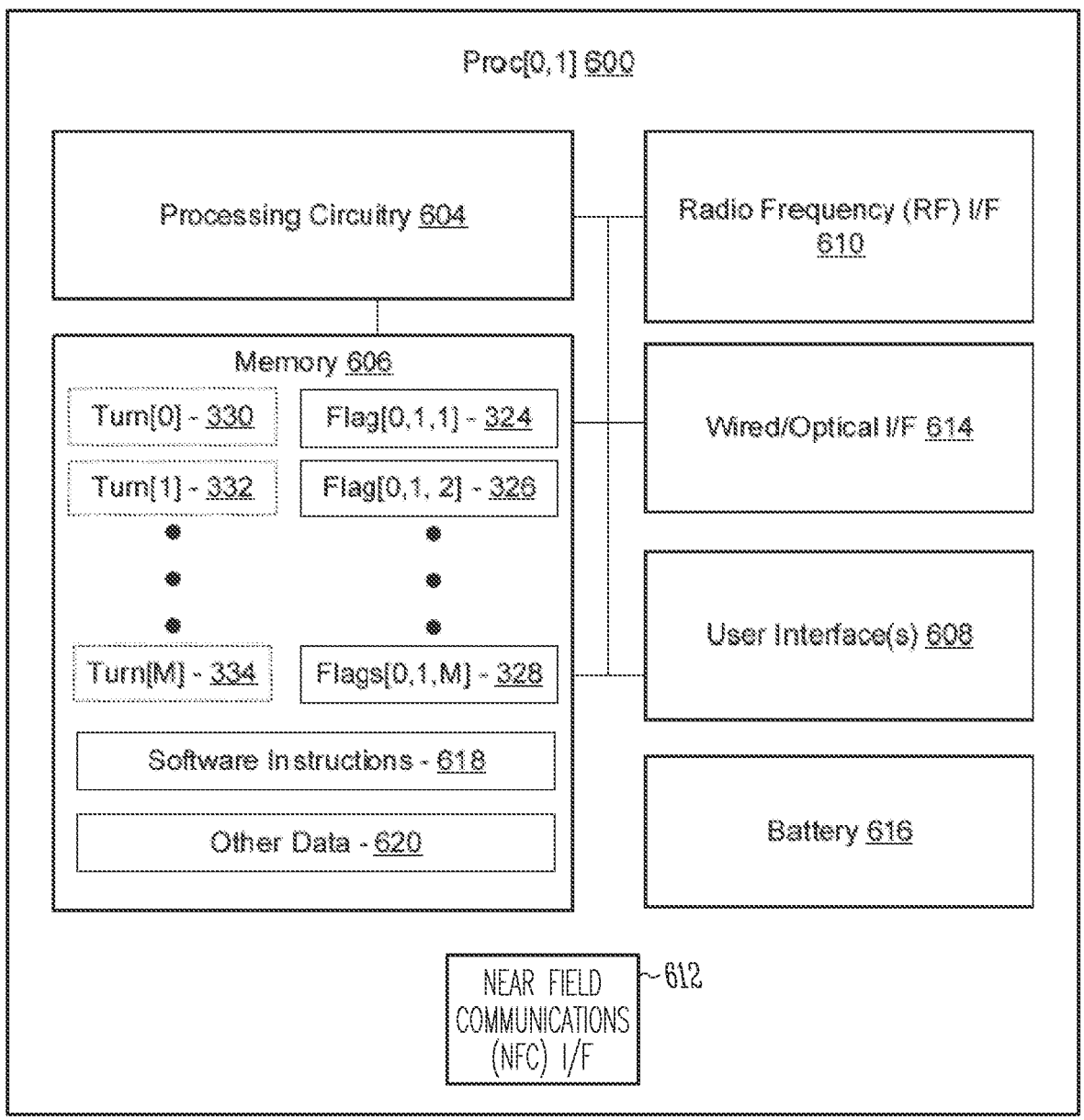
FIG. 6 is a diagram illustrating a computer system according to a sixth described embodiment.

The first computer system 106 includes at least a first processor and a first memory coupled to the first processor. An example of a structure of the first computer system 106 or the second computer system 108 is illustrated in FIG. 6 and described further therewith. The memory of the first computer system 106 is configured to store a first flag (Flag[0]) 110 indicating a desire of the first computer system 106 to access the shared single-access hardware resource 104. The second computer system includes at least a second processor and second memory coupled to the second processor. The second memory is configured to store a second flag (Flag[1]) 112 indicating a desire of the second computer system to access the shared single-access hardware resource 104. The memory of the second computer system 108 is also configured to store a turn variable 114 indicating which of the first computer system 106 and the second computer system 108 has access to the shared single-access hardware resource 104. The operation of the interconnected computer system 100 of FIG. 1 will be described further with reference to FIG. 4.

The interconnected computer system 100 of FIG. 1 may include various optional aspects. According to a first optional aspect, the first computer system 106 resides on a first side of a non-transparent bridge of the PCIe fabric 102 and the second computer system 108 resides on a second side of the non-transparent bridge of the PCIe fabric 102. According to a variation of this optional aspect, the non-transparent bridge of the PCIe fabric performs address translation of data writes and data reads passing therethrough.

According to other optional aspects of the interconnected computer system 100 of FIG. 1, the first computer system 106 includes a plurality of first sub-computer systems residing on a first side of a non-transparent bridge of the PCIe fabric and the second computer system 108 includes a plurality of second sub-computer systems residing on a second side of a non-transparent bridge of the PCIe fabric. According to a variation of this optional aspect, the non-transparent bridge of the PCIe fabric performs address translation of data writes and data reads passing therethrough.

The interconnected computer system 100 of FIG. 1 provides important performance gains as compared to the prior systems. The interconnected computer system 100 may implement an improvement of the Peterson's lock algorithm that provides important operational benefits as compared to prior implementations. Traditionally, Peterson's lock algorithm included the remote writes of flag variables, i.e., Flag[0] stored on process[1] and Flag[1] stored on process [0]. This implementation was inefficient in a PCIe network due to unreliable remote writes, which needed to be followed up with a remote read to confirm that the remote write was successful. Further, when the PCIe network included a PCIe non-transparent bridge, address translation operations introduced additional operational difficulties.

Thus, to overcome the problems with the prior algorithms, the Flag variables are stored locally so that they are accessible via local writes (LWs) and local reads (LRs) as contrasted to remote writes (RWs) and remote reads (RRs). With the prior systems, for process P0 to access the single-access hardware resource, the following operations were required: RW+RR (set Flag[0]), RW+RR (set turn), LR+LR (busy lock), and RW+RR (reset Flag[0]), which totaled 6 remote operations and 2 local operations. With the embodiment of FIG. 1, for process P0 to access the single-access hardware resource, the following operations were required: LW (set Flag[0]), RW (set turn), RR (busy lock+confirm RW), LW (reset Flag[0]), which totaled 2 remote operations and 2 local operations.

With the prior systems, for process P1 to access the single-access hardware resource, the following operations were required: RW+RR (set Flag[1]), LW (set turn), LR+LR (busy lock), and RW+RR (reset Flag[1]), which totaled 4 remote operations and 3 local operations. With the embodiment of FIG. 1, for process P1 to access the single-access hardware resource, the following operations were required: LW (set Flag[1] and turn), RR (busy lock), LW (reset Flag[1]), which totaled 1 remote operation and 3 local operations. Thus, with the prior systems, a total of 10 remote operations and 5 local operations were required. With the embodiment of FIG. 1, a total of 3 remote operations and 5 local operations are required, a savings of 7 remote operations.

The embodiment 100 of FIG. 1 combines PCIe post write read with algorithm workflow. Remote access is reduced dramatically for non-conflict requests. Because most remote access happens in a busy wait loop, the embodiment of FIG. 1 allows easy control using a simple sleep in the loop. Assuming remote operations are the main cost of the workflow, and assuming equal weight of two processes, the average efficiency gain will be reducing 10 remote access down to 3 across 1 duty cycle from both processes. Thus, a 70% reduction in latency or over 200% increase in no-load throughput is achieved.

Figure 2:
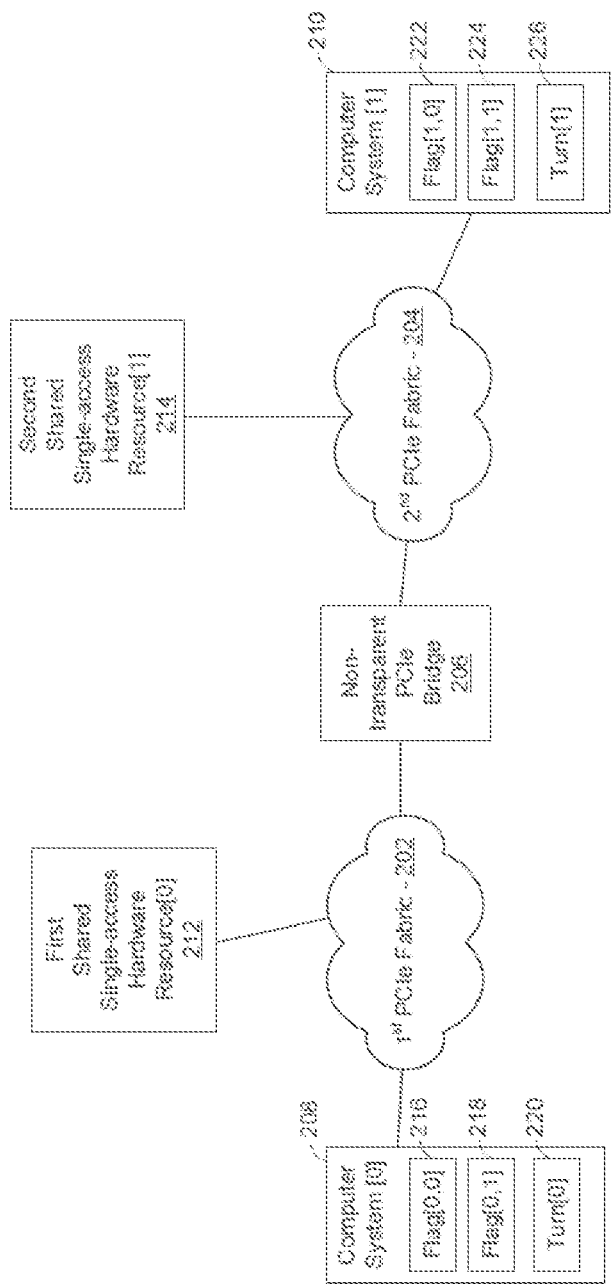
FIG. 2 is a system diagram illustrating an interconnected computer system according to a second described embodiment.

FIG. 2 is a system diagram illustrating an interconnected computer system according to a second described embodiment. The interconnected computer system 200 includes a first computer system 208, a second computer system 210, a first PCIe fabric 202, a second PCIe fabric 204, a non-transparent PCIe bridge 206, a first shared single-access hardware resource 212, and a second shared single-access hardware resource 214.

As shown, the non-transparent PCIe bridge 206 bridges PCIe communications between the first PCIe fabric 202 and the second PCIe fabric 204. The structure and operation of PCIe fabrics and non-transparent PCIe bridges 206 are generally known. With the interconnected computer system 200 of FIG. 2, the first PCIe fabric 202 has a first address domain and the second PCIe fabric 204 has a second address domain that differs from the first address domain. The non-transparent PCIe bridge 206 translates the addresses of transactions that pass therethrough, e.g., reads, writes, etc. Thus, the non-transparent PCIe bridge 206 performs address translation of the reading and writing of flag variables and turn variables, adding latency to these transactions. Further, because the first PCIe fabric 202 and the second PCIe fabric 204 are in different address domains, ensuring that a remote write of a variable is correct requires a corresponding remote read.

The first shared single-access hardware resource 212 couples to the first PCIe fabric 202 while the second single-access hardware resource couples to the second PCIe fabric 204. Each of these shared single-access hardware resources 212 and 214 is/are component(s) that may be only accessed by a single process/computer system at a single time and may be one or more of static memory, dynamic memory magnetic memory, a communication interface, or another type of hardware resource that is may be accessed only by a single process/computer system without jeopardize coherent and consistent resource operations.

The first computer system 208 includes at least a first processor and a first memory coupled to the first processor. An example of a structure of the first computer system 208 is illustrated in FIG. 6 and described further therewith. The memory of the first computer system 208 is configured to store a flag (Flag[0,0]) 216 indicating a desire of the first computer system 216 to access the first shared single-access hardware resource 212 and a flag (Flag[0,1] 218 indicating a desire of the first computer system 208 to access the second shared single-access hardware resource 214. The memory of the first computer system 208 is also configured to store a turn variable (Turn[0]) 220 indicating which of the first computer system 212 and the second computer system 214 has access to the first shared single-access hardware resource 212.

Likewise, the second computer system 210 includes at least a second processor and a second memory coupled to the second processor. An example of a structure of the second computer system 210 is illustrated in FIG. 6 and described further therewith. The memory of the second computer system 210 is configured to store a flag (Flag[1,0]) 222 indicating a desire of the second computer system 210 to access the first shared single-access hardware resource 212 and a flag (Flag[1,1] 224 indicating a desire of the second computer system 210 to access the second shared single-access hardware resource 214. The memory of the second computer system 210 is also configured to store a turn variable (Turn[1]) 226 indicating which of the first computer system 208 and the second computer system 210 has access to the second shared single-access hardware resource 214. The operation of the interconnected computer system 200 of FIG. 1 will be described further with reference to FIGS. 4 and 5.

According to other optional aspects of the interconnected computer system 200 of FIG. 2, the first computer system 208 includes a plurality of first sub-computer systems and the second computer system 210 includes a plurality of second sub-computer systems. According to this optional aspect, the first memory stores a plurality of flags indicating corresponding desires of the plurality of first sub-computer systems to access the shared single-access hardware resource and the second memory stores a plurality of flags indicating corresponding desires of the plurality of second sub-computer systems to access the shared single-access hardware resource.

Figure 3:
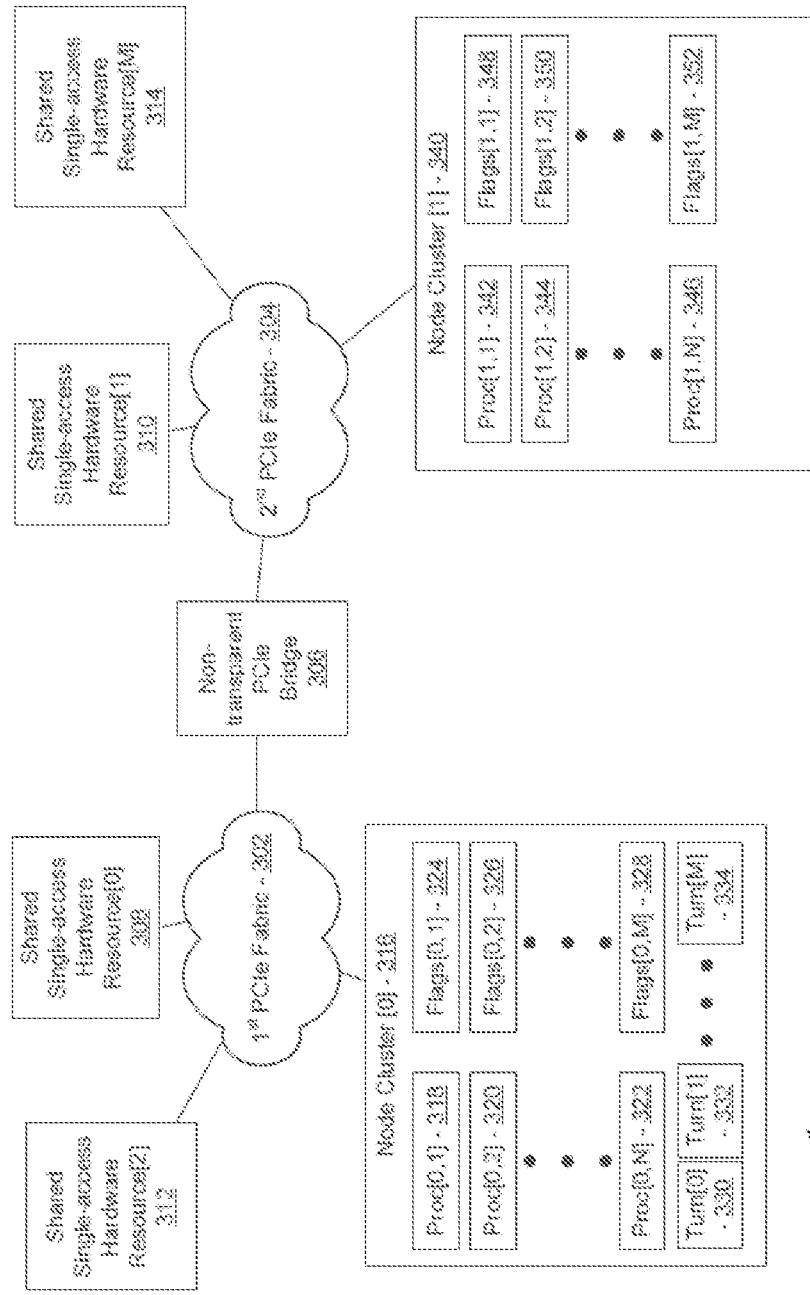
FIG. 3 is a system diagram illustrating an interconnected computer system according to a third described embodiment.

FIG. 3 is a system diagram illustrating an interconnected computer system according to a third described embodiment. The interconnected computer system 300 includes a first PCIe fabric 302, a second PCIe fabric 304, a non-transparent PCIe bridge 304 interconnecting the first PCIe fabric 302 and the second PCIe fabric 304, a first node cluster 316 communicatively coupled to the first PCIe fabric 302 and a second node cluster 340 communicatively coupled to the second PCIe fabric 304. The interconnected computer system further includes a plurality [M] of shared single-access hardware resources 312, 308, 310, . . . , 314, each coupled to one of the first PCIe fabric 302 and the second PCIe fabric 304.

The first node cluster 316 includes N processors Proc[0,1] 318, Proc[0,2] 320, . . . , Proc[0,N] 322 and at least one first memory servicing the N processors. The at least one first memory is configured to store M flags corresponding to the M shared single-access hardware resources 312, 308, 310, . . . , 314, for each of the N processors, i.e., Flags[0,1] 324 Flags[0,2] 326, . . . , Flags[0,M] 328, with a total of N×M flag variables. Flag[N,M] indicates a desire of the Nth process/processor to access the Mth shared-single use resource 314. The at least one first memory is further configured to store turn variables 330, 332, . . . , 334 indicating which of the first node cluster 316 and the second node cluster 340 (or which process/processor) has access to a corresponding shared single-access hardware resource 312, 308, 310, . . . , 314. Alternately, some of the turn variables may be stored in the second node cluster 340. In one particular example, the first node cluster 316 stores turn variables corresponding to the shared single-access hardware resources 312 and 308 coupled to the first PCIe fabric 302 while the second node cluster 340 stores turn variables corresponding to the shared single-access hardware resources 310 and 214 coupled to the second PCIe fabric 304.

The second node cluster 340 includes N processors Proc [0,1] 342, Proc[0,2] 344, . . . , Proc[0,N] 346 and at least one second memory servicing the N processors. The at least one second memory is configured to store M flags corresponding to the M shared single-access hardware resources for each of the N processors, i.e., Flags[1,1] 348 Flags[1,2] 350, . . . , Flags[1,M] 352, with a total of N×M flag variables. Flag[N, M] indicates a desire of the Nth process/processor of the second node cluster 340 to access the Mth shared single-access resource 314. The at least one second memory may be configured to store turn the variables 330, 332, . . . , 334 indicating which of the second node cluster 316 and the second node cluster 340 (or which process/processor) has access to a corresponding shared single-access hardware resource 312, 308, 310, . . . , 314.

As was the case with the interconnected computer system 200 of FIG. 2, the non-transparent PCIe bridge 306 performs address translation of data writes and data reads passing therethrough. Thus, if a processor of the first node cluster 316 accesses the shared single-access hardware resource 308, no address translation is required because access is via only the first PCIe fabric 302. However, if a processor of the first node cluster 316 accesses the shared single-access resource 310, the non-transparent PCIe bridge 306 performs address translation for the transaction, resulting in slower access and less robust resistance to read/write errors.

Figure 4:
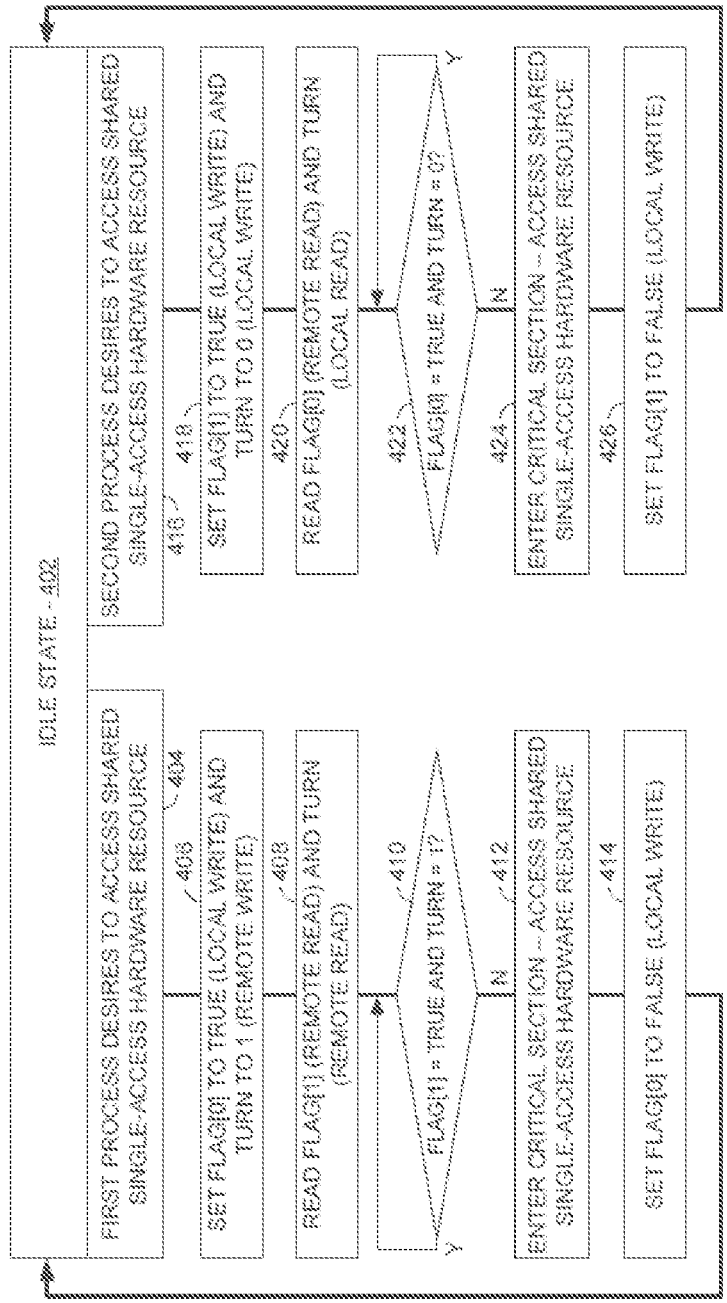
FIG. 4 is a flow chart illustrating operation according to a fourth described embodiment.

FIG. 4 is a flow chart illustrating operation according to a fourth described embodiment. The operations 400 of FIG. 4 may be consistent with the interconnected computer system of FIG. 1 having a PCIe fabric 102, a first computer system 106 communicatively coupled to the PCIe fabric 102, a second computer system 108 communicatively coupled to the PCIe fabric 102, and a shared single-access hardware resource 104 coupled to the PCIe fabric 102. The method commences in an idle state (step 402) for both the first computer system 106 and the second computer system 108. With the operations 400 of FIG. 400, the first computer system stores in a first local memory a first flag indicating a desire of the first computer system to access the shared single-access hardware resource. Likewise, the second computer system stores a second flag indicating a desire of the second computer system to access the shared single-access hardware resource and also and a turn variable indicating which of the first computer system and the second computer system has access to the shared single-access hardware resource From step 402, the first process may desire to access the shared single-access hardware (step 404). The first process then sets Flag[0] to true in a LW operation and sets Turn to 1 in RW operation (step 406). The first process then reads Flag[1] in a RR operation and Turn in RR operation (step 408). So long as Flag[1]=true and Turn=1, the first process remains in a wait state (step 410). Once either Flag[1]=false (as set by the second process) or Turn is not equal to 1 (as written by the second process or another process), the first process enters the critical section in which it accesses the shared single-access hardware resource (step 412). Then, the first process sets Flag[0] to false in a local write operation (step 414). The first process may also set Turn to 1 in step 414. From step 414, operation returns to step 402.

From step 402, the second process may desire to access the shared single-access hardware resource (step 416). The second process then sets Flag[1] to true in a LW operation and sets Turn to 0 in LW operation (step 418). The second process then reads Flag[0] in a RR operation and Turn in LR operation (step 420). So long as Flag[0]=true and Turn=0, the second process remains in a wait state (step 422). Once either Flag[0]=false (as set by the first process) or Turn is not equal to 0 (as written by the first process or another process), the second process enters the critical section in which it accesses the shared single-access hardware resource (step 424). Then, the second process sets Flag[1] to false in a local write operation (step 426). The second process may also set Turn to 0 in step 426. From step 426, operation returns to step 402.

Thus, in general and consistent with step 410, based upon a state of the first flag indicating the desire of the first computer system to access the shared single-access hardware resource and the turn variable, the first computer system accesses the shared single-access hardware resource. Likewise, based upon a state of the second flag indicating the desire of the second computer system to access the shared single-access hardware resource and the turn variable, the second computer system accesses the shared single-access hardware resource.

In various aspects, the first computer system resides on a first side of a non-transparent bridge of the PCIe fabric and the second computer system resides on a second side of the non-transparent bridge of the PCIe fabric. Thus, in various aspects, the operations 400 include the non-transparent bridge of the PCIe fabric performing address translation of data writes and data reads passing therethrough.

Figure 5:
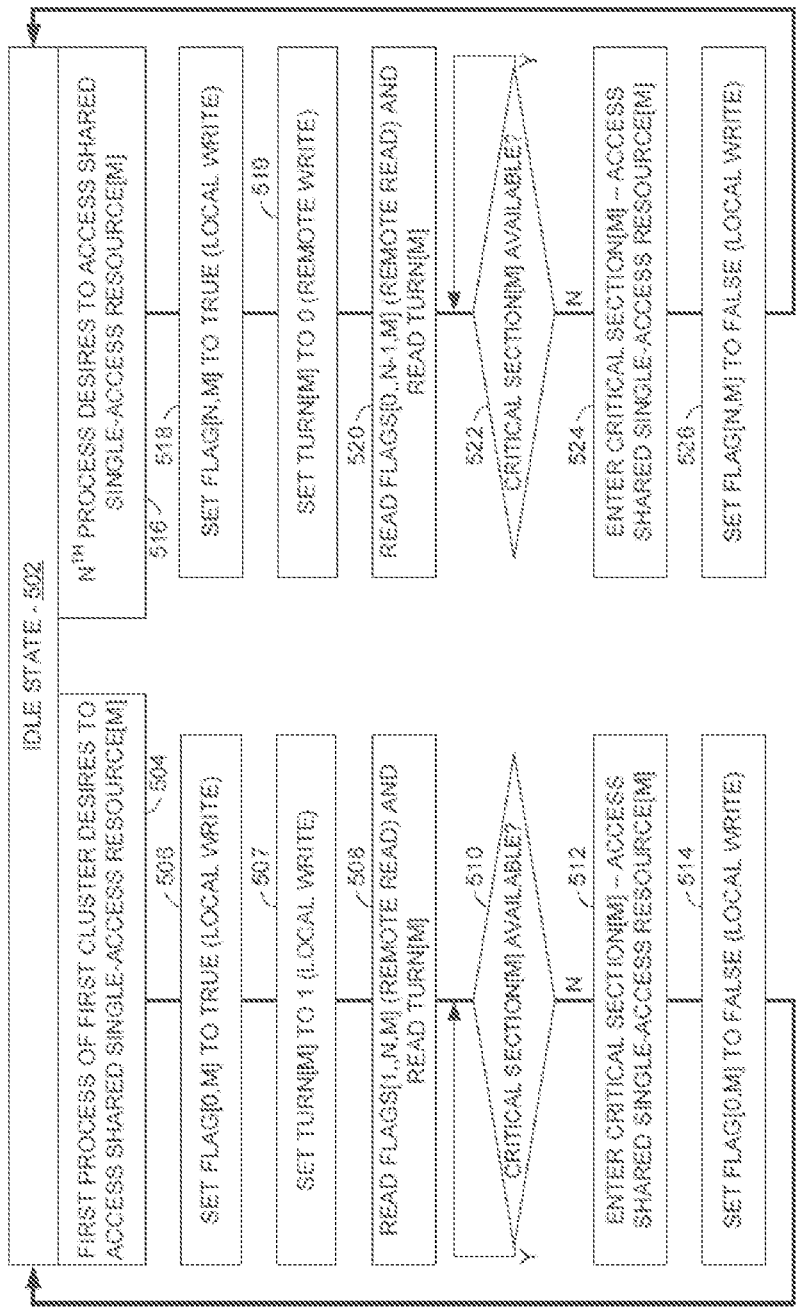
FIG. 5 is a flow chart illustrating operation according to a fifth described embodiment.

One example of an algorithm executable according to FIG. 4 is as follows:

flag[0] is allocated from P0 local memory
flag[1] and turn is allocated from P1 local memory continuously in one structure.
process[0] executes the following operations:
P0: flag[0]=true; // local write
turn=1; // remote write
while (flag[1]==true && turn==1)
// single remote read+confirm
{
  // busy wait
}
// critical section
. . .
// end of critical section
flag[0]=false; // local write
process[1] executes the following operations:
P1: flag[1]=true;
turn=0; // single local write
while (flag[0]==true && turn==0)
// remote read+local read
{
  // busy wait
}
// critical section
. . .
// end of critical section
flag[1]=false; // local write FIG. 5 is a flow chart illustrating operation according to a fifth described embodiment. The operations 500 of FIG. 5 may be consistent with the interconnected node cluster of FIG. 3. The method commences in an idle state (step 502) for both the first node cluster 316 and the second node cluster 340. With the operations 500 of FIG. 500, the first node cluster 316 stores in a first local memory flags indicating desires of each of N processes/processors of the first node cluster 316 to access each of M shared single-access hardware resources. Likewise, the second node cluster 340 stores in a second local memory flags indicating desires of each of N processes/processors of the second node cluster 340 to access each of M shared single-access hardware resources and also turn variables indicating which of the first node cluster 316 and the second node cluster 340 (or processes/processors thereof) has access to the M shared single-access hardware resources.

From step 502, the first node cluster 316 or a process/processor thereof may desire to access the Mth shared single-access hardware (step 504). The first node cluster then sets Flag[0, M] to true in a LW operation (step 506) and sets Turn[M] to 1 in LW operation (step 507). The first node cluster then reads Flags[1,N,M] in a RR operation and Turn[M] in RR (or LR) operation (step 508). So long as Flag[1,N,M]=true and Turn[M]=1 for at least one process/processor of the second node cluster 340, the first node cluster 316 remains in a wait state (step 510). Once either Flag[1,N,M]=false (as set by the second node cluster) or Turn[M] is not equal to 1 (as written by the second node cluster 340 or another process), the first node cluster 316 enters the critical section in which it accesses the Mth shared single-access hardware resource (step 512). Then, the first node cluster sets Flag[0,M] to false in a local write operation (step 514). The first node cluster 316 may also set Turn[M] to 1 in step 514. From step 514, operation returns to step 502.

From step 502, the second (Nth) node cluster 340 may desire to access the Mth shared single-access hardware resource (step 516). The second node cluster then sets Flag[N,M] to true in a LW operation (step 518) and sets Turn[M] to 0 in RW operation (step 519). The second node cluster then reads Flag[0] in a RR operation and Turn in LR operation (step 520). So long as Flag[0]=true and Turn[M]=0, the second (Nth) node cluster remains in a wait state (step 522). Once either Flag[0]=false (as set by the first node cluster) or Turn[M] is not equal to 0 (as written by the first node cluster or another node cluster), the second (Nth) node cluster enters the critical section in which it accesses the Mth shared single-access hardware resource (step 524). Then, the second (Nth) node cluster sets Flag[N,M] to false in a local write operation (step 526). The second (Nth) node cluster may also set Turn[M] to 0 (or to another state based upon which of the node clusters desires access of the Mth resource in step 526. From step 526, operation returns to step 502.

In various aspects, the first node cluster resides on a first side of a non-transparent bridge of the PCIe fabric and the second node cluster resides on a second side of the non-transparent bridge of the PCIe fabric. Thus, in various aspects, the operations 400 include the non-transparent bridge of the PCIe fabric performing address translation of data writes and data reads passing therethrough.

FIG. 6 is a diagram illustrating a computer system according to a sixth described embodiment. The computer system 600 includes processing circuitry 604, memory 606, one or more user interfaces 608, a Radio Frequency (RF) interface 610, a Near Field Communications (NFC) interface 612, a wired/optical interface 614, and a battery 616. The computer system 600 may be one of the computer systems 106 or 108 illustrated in FIG. 1, one of the computer systems 208 or 210 illustrated in FIG. 2, or one of the node clusters 316 or 340 illustrated in FIG. 3.

The processing circuitry 604 may be one or more of a microprocessor, a digital signal processor, application specific processing circuitry, and/or other circuitry capable of executing logic operations based upon pre-programmed instructions or the execution of software instructions. The memory 606 may be dynamic RAM, static RAM, flash RAM, ROM, EEPROM, programmable ROM, magnetic storage, optical storage or other storage that is capable of storing instructions and data. The stored data may be NFC antenna tuning data, audio data, video data, user data, software instructions, configuration data, or other data. The user interface 608 supports one or more of a video monitor, a keyboard, an audio interface, or other user interface device.

The RF interface 610 supports one or more of cellular communications, WLAN communications, WPAN communications, WWAN communications, 60 GHz (MMW) communications, NFC communications, and/or other wireless communications. These wireless communications are standardized in most embodiments and proprietary in other embodiments. The NFC interface 612 couples to NFC antenna 618 and supports NFC communications as will be further described herein. The wired/optical interface 614 supports wired communications, which may be LAN communications, WAN communications, cable network communications, direct data link communications, or other wired communications and/or supports optical communications, which are standardized in some embodiments and proprietary in other embodiments.

Multiple of the components 604, 606, 608, 610, 612, and 614 of the computer system 600 may be constructed on a single integrated circuit die. It is fairly common to form all communication components, e.g., RF interface 610, NFC interface 612, and wired/optical interface 614 on a single integrated circuit. In some cases, even the antennas supporting the RF interface 610 may be formed on a single integrated circuit. In other cases, some or all of the components of the computer system 600 may be formed on a Printed Circuit Board (PCB).

According to an embodiment of the present disclosure, the memory 606 stores Flags 324, 326, . . . , 328 and turn variables 330, 332, . . . , 334. The memory 606 also stores software instructions 618 and other data 620. These instructions are executed by the processing circuitry 604 and the data is operated upon to enact the structures of FIGS. 1, 2 and 3 and the operations of FIGS. 4 and 5.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An interconnected computer system comprising:
a Peripheral Component Interconnect Express (PCIe) fabric;
a first computer system communicatively coupled to the PCIe fabric;
a second computer system communicatively coupled to the PCIe fabric;
a shared single-access hardware resource coupled to the PCIe fabric and remote from both the first computer system and the second computer system;

the first computer system including:
a first processor;
first memory coupled locally to the first processor configured to store:
a first flag indicating a desire of the first computer system to access the shared single-access hardware resource; and
a turn variable indicating which of the first computer system and the second computer system has access to the shared single-access hardware resource; and
the second computer system including:
a second processor; and
second memory coupled locally to the second processor configured to store a second flag indicating a desire of the second computer system to access the shared single-access hardware resource, wherein the turn variable is separated from the second computer system by the PCIe fabric.

2. The interconnected computer system of claim 1, wherein:
the first computer system resides on a first side of a non-transparent bridge of the PCIe fabric; and
the second computer system resides on a second side of the non-transparent bridge of the PCIe fabric.

3. The interconnected computer system of claim 2, wherein the non-transparent bridge of the PCIe fabric performs address translation of data writes and data reads passing therethrough.

4. The interconnected computer system of claim 1, wherein:
the first computer system includes a plurality of first sub-computer systems residing on a first side of a non-transparent bridge of the PCIe fabric; and
the second computer system includes a plurality of second sub-computer systems residing on a second side of a non-transparent bridge of the PCIe fabric.

5. The interconnected computer system of claim 4, wherein the non-transparent bridge of the PCIe fabric performs address translation of data writes and data reads passing therethrough.

6. The interconnected computer system of claim 1, wherein:
the first memory stores a plurality of flags indicating corresponding desires of a plurality of first sub-computer systems to access the shared single-access hardware resource; and
the second memory stores a plurality of flags indicating corresponding desires of a plurality of second sub-computer systems to access the shared single-access hardware resource.

7. The interconnected computer system of claim 1, wherein the shared single-access hardware resource is shared memory.

8. The interconnected computer system of claim 1, wherein:
the first computer system is a first network cluster; and
the second computer system is a shared network cluster.

9. An interconnected computer system comprising:
a first Peripheral Component Interconnect Express (PCIe) fabric;
a second PCIe fabric;
a PCIe non-transparent bridge interconnecting the first PCIe fabric and the second PCIe fabric;
a first node cluster communicatively coupled to the first PCIe fabric;
a second node cluster communicatively coupled to the second PCIe fabric;
a shared single-access hardware resource coupled to one of the first PCIe fabric and the second PCIe fabric and remote from both the first node cluster and the second node cluster;
the first node cluster including a first memory local to the first node cluster and configured to store:
at least one first flag indicating a desire of the first node cluster to access the shared single-access hardware resource; and
a turn variable indicating which of the first node cluster and the second node cluster has access to the shared single-access hardware resource; and
the second node cluster including a second memory local to the second node cluster and configured to store at least one second flag indicating a desire of the second node cluster to access the shared single-access hardware resource, wherein the turn variable is separated from the second node cluster by at least one of the first PCIe fabric and the second PCIe fabric.

10. The interconnected computer system of claim 9, wherein:
the first node cluster includes a plurality of first sub-computer systems residing on a first side of a non-transparent bridge of the PCIe fabric; and
the node cluster includes a plurality of second sub-computer systems residing on a second side of a non-transparent bridge of the PCIe fabric.

11. The interconnected computer system of claim 9, wherein the non-transparent bridge of the PCIe fabric performs address translation of data writes and data reads passing therethrough.

12. The interconnected computer system of claim 9, wherein the shared single-access hardware resource is shared memory.

13. A method of operating an interconnected computer system having a Peripheral Component Interconnect Express (PCIe) fabric, a first computer system communicatively coupled to the PCIe fabric, a second computer system communicatively coupled to the PCIe fabric, and a shared single-access hardware resource coupled to the PCIe fabric and remote from both the first computer system and the second computer system, the method comprising:
the first computer system storing in a first local memory:
a first flag indicating a desire of the first computer system to access the shared single-access hardware resource; and
a turn variable indicating which of the first computer system and the second computer system has access to the shared single-access hardware resource;
the second computer system storing in a second local memory a second flag indicating a desire of the second computer system to access the shared single-access hardware resource, wherein the turn variable is separated from the second computer system by the PCIe fabric;
based upon a state of the first flag indicating the desire of the first computer system to access the shared single-access hardware resource and the turn variable, the first computer system accessing the shared single-access hardware resource; and
based upon a state of the second flag indicating the desire of the second computer system to access the shared single-access hardware resource and the turn variable, the second computer system accessing the shared single-access hardware resource.

14. The method of claim 13, wherein:

the first computer system resides on a first side of a non-transparent bridge of the PCIe fabric; and the second computer system resides on a second side of the non-transparent bridge of the PCIe fabric.

15. The method of claim 13, further comprising a non-transparent bridge of the PCIe fabric performing address translation of data writes and data reads passing therethrough.

16. The method of claim 13, wherein:

the first computer system includes a plurality of first sub-computer systems residing on a first side of a non-transparent bridge of the PCIe fabric; and the second computer system includes a plurality of second sub-computer systems residing on a second side of a non-transparent bridge of the PCIe fabric.

17. The method of claim 13, further comprising a non-transparent bridge of the PCIe fabric performing address translation of data writes and data reads passing therethrough.

18. The method of claim 13, further comprising:

the first local memory storing a plurality of flags indicating corresponding desires of a plurality of first sub-computer systems to access the shared single-access hardware resource; and the second local memory storing a plurality of flags indicating corresponding desires of a plurality of second sub-computer systems to access the shared single-access hardware resource.

19. The method of claim 13, wherein the shared single-access hardware resource is shared memory.

20. The method of claim 13, wherein:

the first computer system is a first network cluster; and the second computer system is a shared network cluster.

* * * * *